Patented July 27, 1943

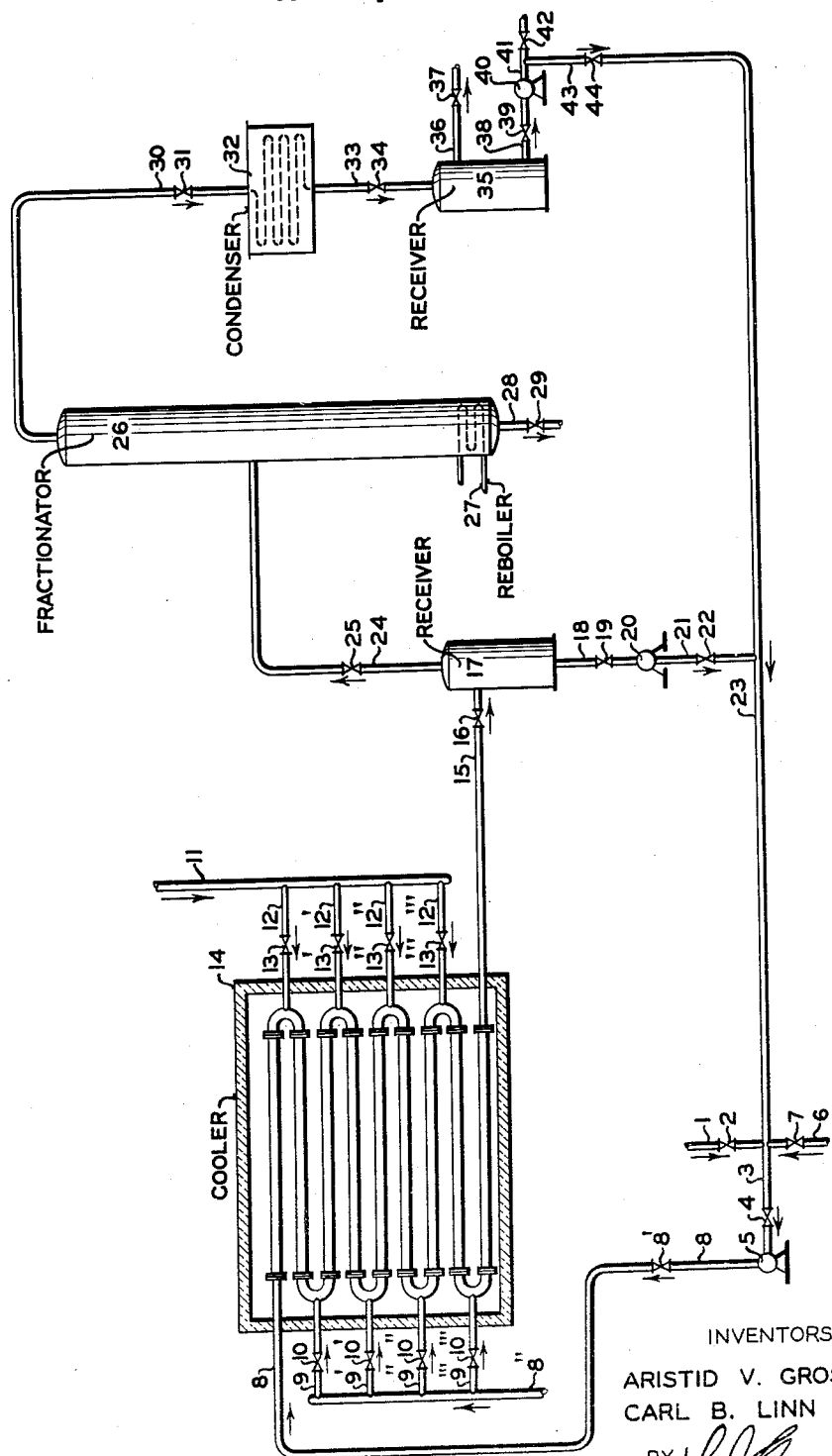

2,325,052

UNITED STATES PATENT OFFICE 2,325,052

ALKYLATION OF PARAFFIN HYDROCARBONS

Aristid V. Grosse, Bronxville, N. Y., and Carl B. Linn, Chicago, Ill., assignors to Universal Oil Products Company, Chicago, Ill., a corporation of Delaware Application September 9, 1940, Serial No. 355,936

10 Claims. (Cl. 260—683.4)

This application is a continuation-in-part of our co-pending application Serial No. 248,777, filed December 31, 1938, now Patent No. 2,267,730, December 30, 1941.

This invention relates to the interaction of isomeric or branched chain paraffin hydrocarbons and mono-olefinic hydrocarbons in the presence of catalysts.

It is more specifically concerned with a simple and easily regulated process involving the use of a liquid catalyst which is substantially unaltered in the course of the reactions and which catalyzes the desired reactions with a maximum of efficiency.

Processes for the formation of higher molecular weight branched chain hydrocarbons from essentially straight chain compounds or less highly branched compounds are of present importance from the standpoint of the motor fuel industry which demands increasing quantities of iso-paraffins within the boiling range of gasoline and particularly iso-octanes, such as, for example, the 2,2,4-tri-methyl pentane which forms the standard of reference in rating the anti-knock value of gasolines. Considerable quantities of butanes and butenes are available as by-products from the cracking of petroleum fractions to produce relatively high primary yields of gasoline and by proper segregation of butanes and butenes by solvent extraction and fractionation methods, particular cuts are available for recombination to produce material yields of the desired iso-octanes. Efforts to alkylate normal butane with butenes in the presence of catalysts have thus far failed unless concurrent isomerization of the normal butanes to iso-butane occurs. However, iso-butane fractions may be made to interact with butenes and particularly iso-butene in the presence of various catalysts to form various iso-octanes.

Catalysts previously tried to effect the alkylation of iso-paraffin hydrocarbons with olefin hydrocarbons include sulfuric acid, phosphoric acid, aluminum chloride, and boron fluoride, all of which have disadvantages which are in a large measure overcome by the use of the catalysts of the present invention. Sulfuric acid, for example, can not be used to effect alkylation with ethylene and gives very poor yields when propylene is used. Furthermore, this acid has a tendency to oxidize hydrocarbons with the formation of sulfur dioxide so that the catalyst is gradually lost by reduction and the products of the reactions are contaminated with sulfur compounds and oxidation products.

Phosphoric acid has a limited application but the reactions are not accelerated to a practical degree unless undesirably high temperatures are employed. Aluminum chloride and similar multivalent metal salts present the usual disadvantages inherent in the use of solid granular catalysts in that the efficiency of the reaction is to some extent contingent on the fineness of subdivision of the catalyst and that recovery of the active salts from their sludges is difficult and expensive. The use of boron fluoride is not practical on account of the cost of this compound.

In one specific embodiment the present invention comprises a process for continuously alkylating iso-paraffin hydrocarbons with mono-olefinic hydrocarbons in the presence of liquid hydrogen fluoride, the process being conducted in a reactor coil with an excess of iso-paraffin flowing therethrough while olefins and hydrogen fluoride are introduced at intermediate points along the line of flow.

We have determined that whereas previous work in alkylating various classes of hydrocarbons with olefins has indicated that the reactions could be brought about in the presence of boron fluoride and minor amounts of hydrogen fluoride, the reactions are better brought about when using merely liquid anhydrous hydrogen fluoride. This catalyst is a liquid boiling at about 20° C. so that it can be used in apparatus which is cooled to maintain temperatures below this point or can be used at higher temperatures if sufficient pressures are maintained upon the apparatus. By maintaining an excess of iso-paraffin at all times, polymerization reactions and the formation of alkyl fluorides are minimized so that the products consist principally of alkylated derivatives of the original iso-paraffins. The catalyst is not changed by oxidation or reduction and if lost mechanically it can be readily recovered and reused while any alkyl fluorides formed are readily decomposable.

We have now further found that still better results in the alkylation of iso-paraffins with olefins in the presence of hydrogen fluoride are brought about when the catalyst and the olefins are injected at successive points along the line of flow of the iso-butane through a continuous reaction coil. By the step-wise and successive injection of the olefins, the iso-butane is maintained in relatively large excess so that alkylation rather than polymerization reactions are fostered and hydrogen fluoride is added in a similar manner to compensate for any losses which may have occurred due to the formation of alkyl fluorides or other side reactions.

For the purpose of illustrating a characteristic apparatus hook-up in which the process may be conducted, the attached drawing shows diagrammatically in general side elevation and by the use of conventional figures an arrangement of interconnected units suitable for continuous alkylation operations. It is understood that minor features of apparatus construction may be modified without departing essentially from the generally broad scope of the invention.

Referring to the drawing, liquid iso-paraffin hydrocarbons such as, for example, iso-butane may be introduced through line 1 containing valve 2 to line 3 containing valve 4 leading to pump 5 while an initial amount of liquid hydrogen fluoride is introduced to line 3 by way of line 6 containing valve 7. Pump 5 discharges through line 8 containing valve 8', line 8 receiving from line 23 separated and recirculated liquid hydrogen fluoride and if desired, a portion of the alkylate or recycled isobutane for further alkylation. The sources of these recycled materials will be described at a later point. In accordance with the present invention the mixture of olefins, iso-paraffin, and hydrogen fluoride is passed through a continuous coil cooler 14 in which an optimum reaction temperature is maintained depending upon the particular iso-paraffins and olefins undergoing reaction and the type of alkylation desired. The discharge from pump 5 enters the coil through valve 8' while an olefin or a mixture of olefins is introduced by pumping means not shown into a header 8" having branch line 9 containing valve 10, and similar branch lines 9' containing valve 10', 9" containing valve 10", and 9''' containing valve 10'''. In a similar manner, necessary amounts of hydrogen fluoride catalyst may be introduced from header 11 into branch lines 12 containing valve 13, 12' containing valve 13', 12" containing valve 13", and 12''' containing valve 13'''. The reaction products follow line 15 containing valve 16 to a receiver 17 in which a separation of hydrogen fluoride and hydrocarbons is effected. The liquid hydrogen fluoride is withdrawn from the receiver through a line 18 containing valve 19 and returned by pump 20 which discharges through line 21 containing valve 22 into line 23 leading to the suction side of pump 5 so that the hydrogen fluoride catalyst is completely recycled.

The hydrocarbon layer in the upper portion of receiver 17 passes through line 24 and valve 25 and enters fractionator 26 containing a reboiler 27, unconverted low boiling hydrocarbons being removed as overhead while higher boiling alkylated products of the reaction are withdrawn through line 28 containing valve 29 from the bottom of the column.

The overhead products pass through line 30 containing valve 31 through condenser 32 and thence through rundown line 33 containing a valve 34 to receiver 35 which has a conventional gas release line 36 containing valve 37 and a liquid draw line 38 containing valve 39 leading to a pump 40 which discharges through line 41 containing valve 42 to storage, but also if desired through line 43 containing valve 44 and leading to line 23 to permit the further alkylation of the paraffins. When individual iso-paraffins such as i-butane are being alkylated this may be recycled for further alkylation from gas vent line 36 containing valve 37 although specific means for accomplishing this recycling are not shown in the drawing. Such means may include compressors and coolers for liquefying the hydrocarbon and returning it to line 43 or directly to line 3 while the alkylated product is completely removed by way of line 41 and valve 42, valve 44 being closed.

The exact temperatures and pressures which should be employed when alkylating various iso-paraffins with various olefins will depend upon the activity and physical characteristics of the hydrocarbons involved so that best results will be obtained when conditions are first determined in small scale apparatus. Temperatures which may be employed with different combinations of iso-paraffins and olefins to effect varying degrees of alkylation may vary from about −30 to +100° C. although as a rule temperatures will be comprised within a much narrower range of the order of from 0 to 50° C. In regard to pressures the only requirement is that sufficient pressure should be used to prevent material vaporization of the reacting hydrocarbons or the hydrogen fluoride catalyst.

For the recovery for reuse of hydrogen fluoride which combines to some extent with olefins to form alkyl fluorides in the course of the alkylating reactions, these fluorides may be passed over granular fluorides such as calcium fluoride or aluminum fluorides which decompose them into hydrogen fluoride and the corresponding olefins. The mixture of olefin and hydrogen fluoride is then passed over solid granular sodium or potassium fluoride which forms addition compounds of the type $NaF \cdot HF$. The olefins liberated may be recycled for further use and the hydrogen fluoride recovered from the double salt by heating.

The following experimental data is given by way of example to indicate the results obtainable when utilizing the present process for alkylating iso-butane with butenes to form iso-octanes. This example has been chosen because of its commercial importance, but it is not to be inferred that the scope of the invention is limited in exact correspondence with the data presented.

Iso-butane is alkylated with normal butene, using 100% hydrogen fluoride as catalyst, a temperature of 20° C. and a process flow similar to that described in the preceding specification. A mixture of approximately 100 parts of iso-butane and 10 parts of hydrogen fluoride is pumped through a coil while the normal butene and hydrogen fluoride are introduced along the line of flow. The olefins are introduced at a rate to obtain a 100:1 ratio of iso-butane to normal butene and the hydrogen fluoride is introduced so as to maintain an effective concentration of hydrogen fluoride equal to approximately 0.1 volume of the iso-butane present. A 60% yield of octanes consisting largely of 2,2,4-trimethyl pentane is obtained in a single pass while the yield is increased to 90% of the theoretical by recycling of the unalkylated iso-butane. The alkylate contains less than 0.2% of fluorine.

We claim as our invention:

1. A process for alkylating iso-paraffin hydrocarbons with olefin hydrocarbons in the presence of hydrogen fluoride as a catalyst which comprises continuously passing a mixture of said iso-paraffin hydrocarbons and hydrogen fluoride through a reaction zone of relatively small cross section in proportion to its length while introducing successive portions of said olefin hydrocarbons along the line of flow in said reaction zone and simultaneously introducing hydrogen fluoride along the line of flow.

2. A process for alkylating iso-paraffin hydrocarbons with olefin hydrocarbons in the presence of hydrogen fluoride as a catalyst which comprises continuously passing a mixture of said iso-paraffin hydrocarbons and hydrogen fluoride at a temperature of from about −30 to about +100° C. through a reaction zone of relatively small cross section in proportion to its length while introducing successive portions of said olefin hydrocarbons along the line of flow in said reaction zone and simultaneously introducing hydrogen fluoride along the line of flow.

3. A process for alkylating iso-paraffin hydrocarbons with olefin hydrocarbons in the presence of hydrogen fluoride as a catalyst which comprises continuously passing a mixture of said iso-paraffin hydrocarbons and hydrogen fluoride at a temperature of from about −30 to about +100° C. and under a pressure adequate to prevent substantial vaporization of the reactants, through a reaction zone of relatively small cross section in proportion to its length while introducing successive portions of said olefin hydrocarbons along the line of flow in said reaction zone and simultaneously introducing hydrogen fluoride along the line of flow.

4. A process for alkylating iso-butane with normally gaseous olefin hydrocarbons in the presence of hydrogen fluoride as a catalyst which comprises continuously passing a mixture of said iso-butane and hydrogen fluoride through a reaction zone of relatively small cross section in proportion to its length while introducing successive portions of said olefin hydrocarbons along the line of flow in said reaction zone and simultaneously introducing hydrogen fluoride along the line of flow.

5. A process for alkylating iso-butane with normally gaseous olefin hydrocarbons in the presence of hydrogen fluoride as a catalyst which comprises continuously passing a mixture of said iso-butane and hydrogen fluoride at a temperature of from about −30 to about +100° C. through a reaction zone of relatively small cross section in proportion to its length while introducing successive portions of said olefin hydrocarbons along the line of flow in said reaction zone and simultaneously introducing hydrogen fluoride along the line of flow.

6. A process for alkylating iso-butane with normally gaseous olefin hydrocarbons in the presence of hydrogen fluoride as a catalyst which comprises continuously passing a mixture of said iso-butane and hydrogen fluoride at a temperature of from about −30 to about +100° C. and under a pressure adequate to prevent substantial vaporization of the reactants, through a reaction zone of relatively small cross section in proportion to its length while introducing successive portions of said olefin hydrocarbons along the line of flow in said reaction zone and simultaneously introducing hydrogen fluoride along the line of flow.

7. A process for alkylating iso-paraffin hydrocarbons with olefin hydrocarbons in the presence of hydrogen fluoride as a catalyst which comprises continuously passing a mixture of said iso-paraffin hydrocarbons and hydrogen fluoride at a temperature of from about −30 to about +100° C. and under a pressure adequate to prevent substantial vaporization of the reactants, through a reaction zone of relatively small cross section in proportion to its length while introducing successive portions of said olefins along the line of flow in said reaction zone, simultaneously introducing hydrogen fluoride along the line of flow, and maintaining a molal excess of said iso-paraffin hydrocarbons in respect to said olefin hydrocarbons.

8. A process for alkylating iso-butane with normally gaseous olefin hydrocarbons in the presence of hydrogen fluoride as a catalyst which comprises continuously passing a mixture of said iso-butane and hydrogen fluoride at a temperature of from about −30 to about +100° C. and under a pressure adequate to prevent substantial vaporization of the reactants, through a reaction zone of relatively small cross section in proportion to its length while introducing successive portions of said olefin hydrocarbons along the line of flow in said reaction zone, simultaneously introducing hydrogen fluoride along the line of flow, and maintaining a molal excess of said iso-butane in respect to said olefin hydrocarbons.

9. In the catalytic alkylation of iso-paraffins with olefins in the presence of hydrogen fluoride as the alkylating catalyst, the method which comprises passing a stream of iso-paraffin hydrocarbons through a reaction zone maintained under alkylating conditions, successively adding increments of olefin hydrocarbons and hydrogen fluoride to said stream by introducing the same at spaced points along the line of flow through the reaction zone, and reacting a substantial portion of the iso-paraffin with olefin hydrocarbons during the passage thereof through the reaction zone.

10. The process as defined in claim 9 further characterized in that the olefin hydrocarbons and the hydrogen fluoride are separately introduced at spaced points along the line of flow of the iso-paraffin stream through the reaction zone.

ARISTID V. GROSSE.
CARL B. LINN.